United States Patent [19]
Seitz

[11] 3,895,313
[45] July 15, 1975

[54] LASER SYSTEMS WITH DIAMOND OPTICAL ELEMENTS

[75] Inventor: J. Russell Seitz, Cambridge, Mass.

[73] Assignee: Entropy Conversion, Inc., Burlington, Mass.

[22] Filed: Sept. 17, 1973

[21] Appl. No.: 397,970

[52] U.S. Cl. .................... 331/94.5 D; 331/94.5 C
[51] Int. Cl. ............................................. H01s 3/02
[58] Field of Search ..... 331/94.5 C, 94.5 D, 94.5 P; 356/244

[56] References Cited
UNITED STATES PATENTS 3,646,475  2/1972  Taylor................... 331/94.5 D
3,660,776  5/1972  Yamaka.................. 331/94.5 D

OTHER PUBLICATIONS

Toth et al., "Diamond-Windowed Cell for Spectrophotometry of Molten Fluoide Salts," Analytical Chem. Vol. 41, No. 4 Apr. 1969, pp. 683–685.
Gunn, "Laser Structure," IBM Technical Disclosure Bulletin, Vol. 16, No. 6, Nov. 1973, p. 1854.

Primary Examiner—Ronald L. Wibert
Assistant Examiner—Michael J. Tokar

[57] ABSTRACT

High power laser systems with optical elements of diamond having a thermal conductivity of at least 10 watts/cm.°K at 300°K. and an optical absorption at the laser beam wavelength of no more than 10–20%.

38 Claims, 23 Drawing Figures

PATENTED JUL 15 1975 3,895,313
SHEET 4

LASER SYSTEMS WITH DIAMOND OPTICAL ELEMENTS

BACKGROUND OF THE INVENTION

1. Field of the Invention

This invention relates to lasers, and more particularly to optical elements for laser beams having high-power densities of at least 10,000 watts per square centimeter over an area of at least one square millimeter.

2. Description of the Prior Art

In the operation of modern, high-powered lasers, i.e., those generating a continuous beam with a power density of at least 10,000 watts per square centimeter or an intermittent beam with an equivalent power and energy content, there currently exists no solid window capable of transmitting the laser beam without melting or otherwise causing gross optical degradation.

Heretofore known solid materials which are acceptably transparent at high-power laser wavelengths not only have unacceptably poor thermal conductivity for edge cooling, but also poor mechanical properties, which make necessary great window thickness and so exaggerate their thermal problems. Such windows cannot successfully transmit continuous power densities much in excess of about 1,000 watts/cm$^2$, although laser applications such as ceramic and metal fabricating, drilling, and welding require continuous power densities of at least 10,000 watts/cm$^2$ over considerable areas.

Solid materials, including diamond, were considered for use in laser windows in a study conducted for the Advanced Research Projects Agency, results of which were published as Rand Report No. 545-PR, 1971, "Optical Distortion by Heated Windows in High-Power Laser Systems." Diamond was calculated to have an unacceptably low figure of merit, and was dropped from the study. The particular diamond referred to was a natural gem having a reported thermal conductivity of 1.5 watts/cm$^2$°K at 300°K.

So-called aerodynamic windows, consisting of fast moving gas curtains, have been used as windows for high-powered lasers, but their limited size, complicated structure, unsatisfactory performance in various atmospheric environments, and distorting effect on the laser beam render them less than satisfactory substitutes for solid windows.

Power density is also restricted by the capabilities of heretofore known reflectors used in laser resonant cavities, which can heat up and fail at power densities well below the laser's maximum generation capability due to ablation of the reflecting surface and local melting of the heat conducting substrate.

BRIEF SUMMARY OF THE INVENTION

A principal object of the present invention is the provision of an improved high-power laser system.

Other objects are the provision of a laser system having a novel solid laser window capable of transmitting much more powerful beams than heretofore known solid windows, and of methods of transmitting such a beam through a solid medium.

Still other objects are the provision of a laser system having novel reflecting means capable of reflecting much more powerful beams than heretofore known reflectors, and of methods for reflecting such a beam.

In accordance with the above stated objects, my invention comprehends a laser system and method that includes a laser generator capable of generating either a continuous or intermittent beam having a long term heating effect on diamond equivalent to that of a continuously generated beam having a power density of at least 10,000 watts/cm$^2$ over an area of at least one square mm., and a wavelength within the set consisting of the wavelengths from about 0.2 to about 2 microns, about 3.6 to about 3.8 microns, and above about 6.8 microns. A diamond laser window having specifically defined characteristics, i.e., formed from generally transparent diamond having a thermal conductivity of at least 10 watts/cm°K at 300°K and an optical absorption at the beam wavelength of no more than 10-20%, is employed in conjunction with means for cooling the window to enable the transmission of extraordinarily powerful beams out of the laser enclosure; beams much more powerful than was possible with heretofore known solid windows, and with a smaller window area.

Synthetic diamond, capable of being grown to sustain continuous power densities of much more than 10,000 watts/cm$^2$ is preferred. Its thermal conductivity can be enhanced by growing it from only one or the other of the isotopes carbon 12 and carbon 13.

In particular it is preferred that substantially intrinsic diamond be employed, i.e., diamond having relevant properties which closely approach the limits predicted by the theory of the perfect solid state.

In certain embodiments preferably the diamond window is fabricated at one-fourth or three-fourths wavelength thicknesses, at which the window is substantially lossless.

Various cooling arrangements are included to remove heat from the diamond window, which may be formed from either a single diamond monolith or from an array of diamond panes. In the latter case the panes may conveniently be located to coincide with discrete high energy density nodes in the laser beam.

Many lasing mediums may be employed for the generation of a beam at any wavelength within the defined range. Laser systems of particular interest include a carbon dioxide lasing medium with a beam wavelength of 10.6 microns, and either a deuterium/fluorine or carbon monoxide lasing medium with a beam wavelength between 3.6 to about 3.8 microns.

My invention also comprehends the use of diamond having the above-described properties in reflectors for high-powered laser beams, either as a substrate for a reflecting medium, or as the reflecting medium itself when the beam wavelength is about 5.6 microns.

For the purpose of more fully explaining preferred embodiments of the invention, reference is now made to the following detailed description thereof, together with the accompanying drawings.

DETAILED DESCRIPTION OF THE INVENTION

Figure 1:
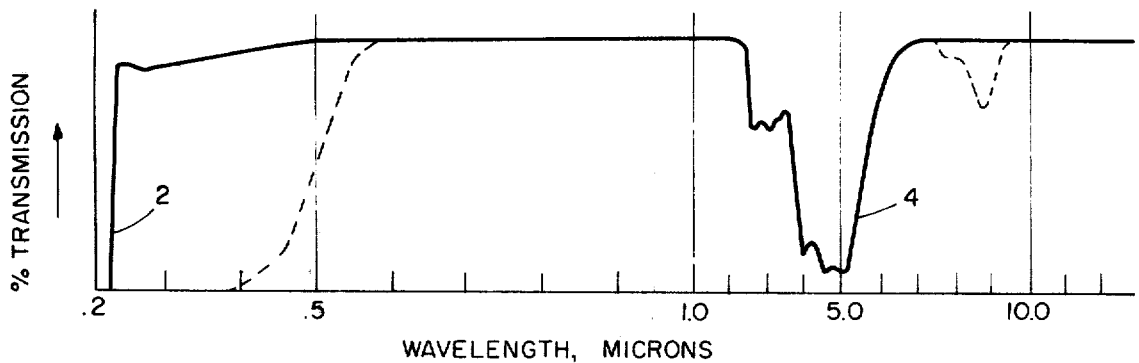
FIG. 1 is a graph showing the optical transmissivity of high purity diamond plotted against the wavelength of the applied radiation.

I have discovered that, although much diamond is not suitable for high-powered laser windows, a solid medium of diamond having extraordinary specifically defined characteristics is uniquely useful as a solid laser transmission material, and in fact makes possible the transmission of much more powerful beams than can be achieved with any other presently known solid material and with a window weight many times less.

Specifically, according to my discovery, laser windows formed from diamond with a thermal conductivity of at least 10 watts/cm°K at 300°K are capable of transmitting continuous beams having power densities in excess of 10,000 watts/cm$^2$ over an area of at least one square mm., at those wavelengths in the infrared spectrum at which the optical absorption of the diamond window is no more than about 10–20%. Even greater power densities can be sustained with intermittent beams having an equivalent long term heating effect, i.e., a cyclical beam duration of at least about one millisecond, which is the approximate time required for thermal equalization to occur over one cm. of diamond. Much greater power densities, well in excess of 1,000,000 watts/cm$^2$ for a continuous beam, can be transmitted over an area of at least one square millimeter through high purity synthetic diamond having a thermal conductivity of at least about 20 watts/cm°K at 300°K with appropriate cooling, although it is preferred that the beam rise time be at least 100 microseconds per 1,000 joules/cm$^2$ in order to avoid deleterious surface effects. Diamond may indeed be fabricated with such superior thermal qualities that it is expected the ultimate limitation on the power that may be transmitted through diamond windows will result either from surface breakdown, self-focusing, or from the electrical field exceeding the lattice bond energy, rather than from thermal breakdown.

Extremely high power density can be achieved with a synthetic diamond window of purity greater than 1 in 10$^9$, isotopic singularity and low dislocation density, operated in a pressurized helium environment with a central ambient temperature of 70°K at which temperature a thermal conductivity exceeding 200 w/cm°K may be obtained. Under these conditions the absorption will be less than 1% per cm. and operating powers exceeding 100 megawatts/cm$^2$ attained in the CW. mode.

By achieving high levels of chemical purity in the synthesis of optical quality diamond crystals, an improvement of from 2 to tenfold in the thermal conductivity of the synthetic diamond over natural diamond has been obtained. Further improvement may be effected by assuring the dispersion at the atomic level of the remaining impurities and reducing the contribution of Umklapp scattering to loss of thermal conductivity by growing the synthesized diamond from isotopically pure carbon 12 or carbon 13.

For certain applications it is preferred that substantially intrinsic diamond be employed, in particular diamond whose chemical, electronic and optical properties substantially approach the limits predicted by the theory of the perfect solid state.

Referring now to FIG. 1, the absorption spectrum of synthetic diamond from 0.2 to 14 microns is shown, with absorption caused by a dispersed nitrogen impurity content of a few parts per million indicated by dashed lines. (The graph of FIG. 1 was presented in "Physical Properties of Laboratory-Made Diamond," H. M. Strong and R. M. Chrenko, *The Journal of Physical Chemistry*, Vol. 75, No. 12, 1971, p. 1841.)

Diamond is transparent at wavelengths greater than the fundamental electronic absorption edge 2 located at about 0.2 microns. This continues out to wavelengths of a few hundred microns, at which the transition region between light and microwaves is reached. Since diamond is a substantially lossless dielectric medium for submilimeter microwaves as well as infrared radiation, the utilization of the high power window materials and configurations contained in this application for high power microwave as well as optical application is anticipated. Between about 2 and about 6.8 microns, transmission through diamond is attenuated, reaching an intermediate peak at about 3.6 to 3.8 microns and a minimum at about 5 microns. The loss in transmission between 2 and 5 microns is due principally to lattice vibration from 1, 2 and 3 phonon absorption, resulting in heating of the diamond and a severe reduction in power transmission capability. At the 3.6 to 3.8 micron peak, however, the absorption level is low enough to permit successful high-powered operation with lasers operating at about that wavelength, such as deuterium/fluorine (D*F) or carbon monoxide. In the region from about 5.6 to about 6.8 microns, conventionally denoted the reststrahl edge 4, the loss is due principally to reststrahl reflection (a surface phenomenon) rather than to absorption. In the lower wavelength portion of that region, diamond is uniquely useful as a reflector.

Diamond's impurity content is paramount in determining both thermal conductivity and optical absorption. Synthetic diamond is characterized on the whole by a much lower impurity content than natural diamond, poor synthetic diamond generally being approximately equivalent in purity level to the better natural diamonds. As diamond is purified to an overall impurity content comparable to that of semiconductive, high resistivity silicon or germanium, its intrinsic absorption shows a continuous improvement in infrared transparency. For diamond having an impurity content of less than one part in ten million and a carbon 12/carbon 13 ratio greater than 10,000/1, intrinsic absorption at a wavelength of 10.6 microns is about 1% per cm. or less, enabling the transmission of beams with extremely high power densities. Although synthetic diamond is preferred, most natural diamond classifiable as type IIA or IIB, i.e., the purest natural diamond and natural diamond with a boron impurity of less than about one part per million, is also suitable for high-powered laser windows.

Non-impurity related absorption effects can also be of critical importance at certain beam wavelengths. Diamond is strong enough for the fabrication of windows having a thickness equal to one-quarter or three-quarters the wavelength of most lasers, at which thicknesses almost total transmission occurs due to known interference phenomena. These thin diamond pellicles may be used alone or in conjunction with antireflectance coatings as substantially lossless, easily face cooled high-power laser windows. For example, the extreme strength of diamond makes practical the fabrication of physical windows (pellicles) with a thickness in the order of 2.6 microns (one-fourth wavelength for a $CO_2$ laser generating a 10.6 micron beam).

Figure 2:
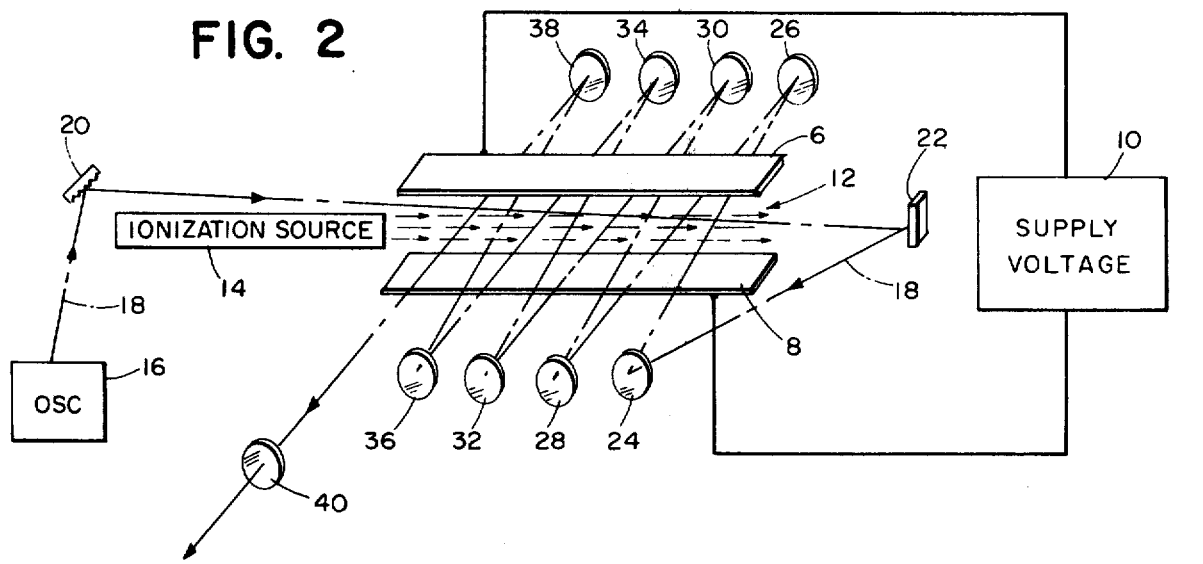
FIGS. 2 and 3 are schematic illustrations of laser systems embodying features of the invention.

Referring now to FIG. 2, a laser system embodying the present invention and operating near atmospheric pressure is shown schematically to have an anode 6, a cathode 8, a voltage supply 10 connected to impress a potential difference across the anode and cathode, a lasing medium 12 such as $CO_2$ gas contained or in motion impelled by suitable means between the anode and cathode, an ionization source 14 to ionize the lasing medium, and an oscillator 16 adapted to direct a beam 18 reflectively off of a tuneable grating 20 to a first reflector 22 and a series of reflectors 24–38 aligned on opposite sides of the lasing medium 12 to successively receive the beam 18 after transit through the ionized lasing medium 12 from the previous reflector and reflect the beam 18 back through the lasing medium 12 to the subsequent reflector. The last reflector 38 directs the beam through the lasing medium 12 for transmission through a diamond window 40 and out of the laser. The power of beam 18 is amplified during each transit through the lasing medium 12 according to the known lasing process.

Figure 3:
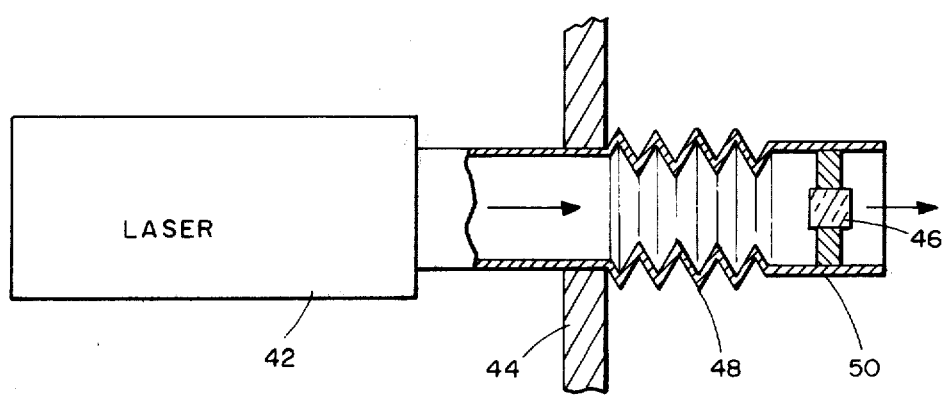

In FIG. 3, a laser system is depicted in which a laser 42 is enclosed in a resonant cavity, the front wall of which is indicated at 44. A diamond window 46 is positioned at the forward end of an insulated expansible metal bellows 48 that provides mechanical flexibility in the positioning of the window 46, as well as a measure of thermal transfer reduction and electrical isolation. The arrangement shown is similar to apparatus used to provide a transition or conduction to the external environment from mechanical or electrical apparatus on the inside of any vacuum system. The window 46, if of a simple thermal geometry, that is, cooled by direct heat conduction into a finned metal heat sink, is sufficiently compact to require not more than a two-fold increase in the external diameter of the window assembly 50 over the diameter of the window 46 itself. A reasonably large fraction of the bulk of the window 46, as dictated by heat transfer considerations, would be used for actual transmission of the output beam. The transition from the cavity wall 44 to the insulating stand-off 48 has a taper, either positive or negative, depending on the location of the confocal point of the coherent output beam. The taper is one of reduction of diameter towards the window location for a beam that converges near or in the window, and of increase in diameter for a laser having its focal point in the cavity and in which the beam diverges as it passes through the window 46. In the case of a Fabre-Perot resonator, the window might be mounted along the optical axis of the two mirrors comprising the Fabre-Perot cavity in a Cassegrain configuration, that is, mounted at a hole drilled at the center or at some similar focal or coaxial point of one of the output mirrors.

The design of the transverse or resonant optical cavity in a high-powered laser is flexible, the location of the output window being a matter of geometrical convenience. In resonant cavities, the window is usually located at one end of the elongated cavity. In transversely excited systems, the window can be located at any desired longitudinal position. If the cavity employs a spherical mirror as a resonator, there will be points of minimum beam cross-sectional area and maximum power density, known as confocal points, which, because of their small physical size, constitute a convenient location for a high-power density window. By changing mirrors within the cavity to adjust the reflectional geometry, window size may be minimized by placing the window as close to a confocal point of the optical cavity as possible, without fear of destroying the diamond window.

The upper limits of the window's power transmission capability are determined by, among other factors, the rate at which heat can be removed from the diamond. A portion of its excellent thermal conductivity will be wasted if a large rise in temperature is permitted. I have therefore devoted considerable attention to the problem of heat removal. While in the past it has generally been assumed that the medium to which heat is transferred will have a greater thermal conductivity than that of the window material, the superlative thermal conductivity of diamond reverses this situation and permits the window material itself to play an important role in heat transfer.

FIGS. 4a–4d illustrate the steps performed in the assembly of one window embodiment. While generally depicted in the accompanying drawings as having flat, parallel opposed faces, it should be understood that laser window diamond may also be formed in other configurations, such as lenses. There is no intention to limit the surface curvature of the laser windows described herein to any particular type.

Figure 4A:
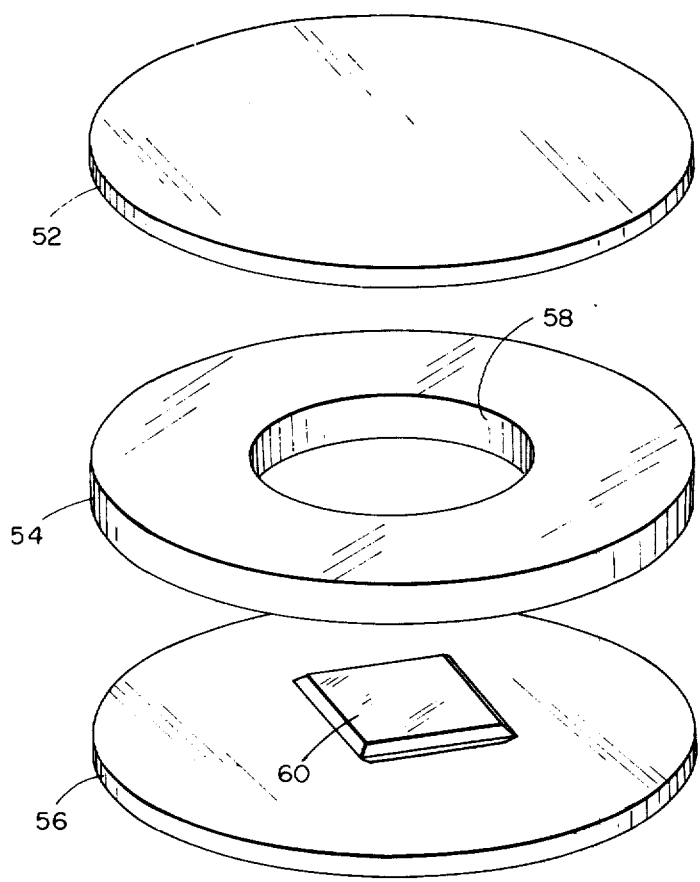
FIGS. 4a–4d and 5–18 show various means for forming and cooling a diamond window.
Figure 4B:
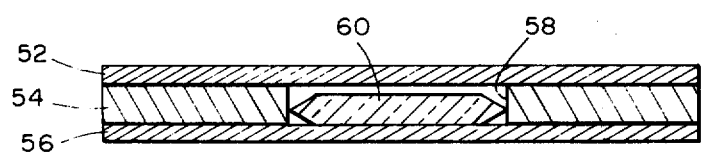
Figure 4C:
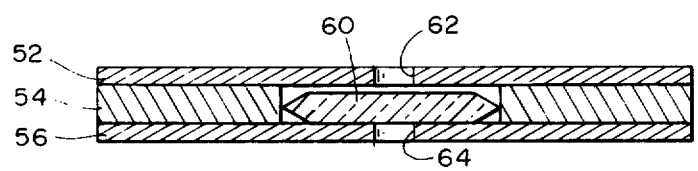
Figure 4D:
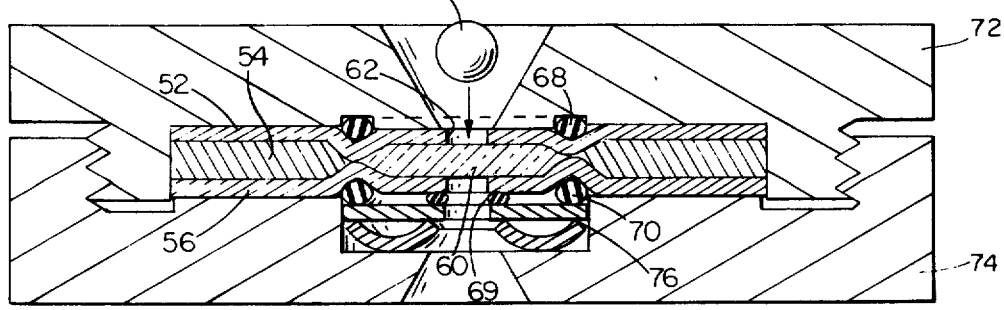

Three silver disks 52, 54, and 56 approximately three-fourths inch in diameter and 1½ mm thich were employed, the tops and bottom disks 52 and 56 being left unperforated and the central disk 54 having a central opening 58 one-fourth inch in diameter. The perforated disk 54 was silver soldered to the bottom disk 56 using Handy & Harman Hard Silver Solder. The diamond 60 constituting the window material was then placed in the opening 58 on the central disk 54 and surrounded by a ring of silver solder wire, also Handy & Harman Hard Silver Solder. The diamond 60 having been positioned, the upper disk 52 was clamped in place above it, and the entire assembly heated in a reducing flame from a hydrogen torch while local heat was applied to the bottom of the silver disk 56. At the same time a flux mixture was applied to all the exposed surfaces. The silver solder melted coherently and the two assemblies were permanently fused together with the diamond 60 in the center, as shown in FIG. 4b. The diamond was exposed by the drilling of two centered openings 62 and 64 approximately three millimeters in diameter, shown in FIG. 4c, from opposite sides of the silver disks 52 and 56 directly to the surface of the diamond, which was not damaged by the drilling operation. The joined assembly was then placed in boiling water for two days to dissolve any flux that might have entered the cavity containing the diamond 60.

At this stage the diamond 60 was not tightly held, and was free to rattle about a millimeter from side to side within the cavity. This was corrected by a series of cold forging operations, in which conical and hemispherical punch presses of 6 to 8 mm diameter were centered over the holes and hammered gently. This achieved good mechanical contact around the periphery of the diamond and deformed the silver disks 52 and 56 to reduce the volume of the unoccupied space in the cavity holding of the diamond 60, see FIG. 4d. Subsequently, a spherical indenter 66 was used to compress the central portion of the silver into direct heat transfer relation with the diamond. The assembly may be held in compression by three O-rings 68, 69 and 70 wedged into the disk deformation by a pair of threaded collars 72 and 74 and a powerful spring washer 76.

The diamond was a cuboctahedral crystal of good physical perfection and crystallographic habit, having no unusual internal structure as determined by X-ray defraction before and after its use as a window. It was tested between polarizers and a polarizing microscope before insertion in the mount and exhibited a typical residual stream pattern which was only slightly altered after its use as a window. This is attributed primarily to the heating during the soldering operation, rather than to laser irradiation.

The diamond 60 weighed 65 milligrams and exhibited a bulk light absorption of about 5%/cm. at 10.6 microns, with about 5% of its central area used for transmission. It operated successfully with a 10,000 watt beam 1 mm. in diameter, having a central power density of about 12,000,000 w/cm.$^2$, excess heat being conducted away by the silver sink.

Figure 5:
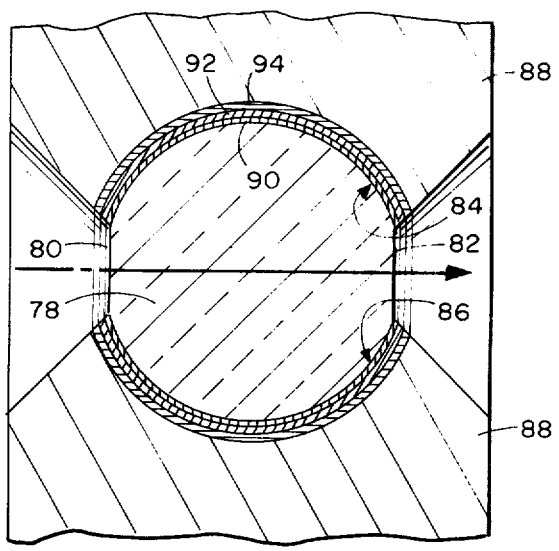

In the embodiment of FIG. 5, direct heat transfer into the portion of the diamond not traversed by the infrared laser beam is employed as an advantageous method of heat transfer. A generally spherical diamond bead 78 having the required high thermal conductivity and infrared transparency is provided with a pair of diametrically opposed flat, circular, and crystallographically parallel polished spots 80 and 82 forming the end boundaries of a window occupying an inward portion of the diamond. The diamond 78 is set between two generally hemispherical cavities 84 and 86 drilled into an enveloping mass of a good thermal conductor 88, preferably copper, which almost but not completely surrounds the diamond. Heat is thereby transferred away from the inward portion of the diamond through the surrounding outward portion and into the metallic heat sink. Preferably, an interface is provided to facilitate the transfer of heat from the diamond, which conducts heat by phonon conduction, to the copper, which conducts heat by electronic conduction. A series of layers of sputtered metal comprising in succession a titanium layer 90, a platinum layer 92, and a gold layer 94, are applied to the diamond sphere 78 to provide a gradient of gradual reduction of the velocity of sound from that which is possesses in diamond to that which it possesses in copper. This reduces the so-called thermal impedance at the diamond/copper interface. Various other metals can be used in the heat sink 88, including, in order of preference after silver and copper, the following: gold, aluminum, titanium, berylium, molybdenum and members of the platinum group.

Figure 6:
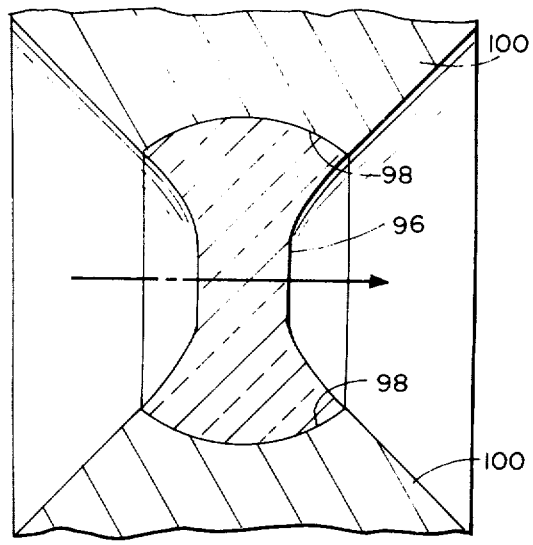

In the embodiment of FIG. 6, the thickness of the diamond window is shown as reduced in order to minimize the amount of heat absorbed. A monolithic diamond is fabricated so as to comprise a thin circular window disk area 96, produced by machining away a large fraction of the mass of a diamond sphere. This provides excellent heat transfer via the relatively thick extremeties 98 of the diamond, while avoiding the relatively large bulk absorption of the spherical window of FIG. 5. A metallic heat sink 100 is provided in heat transfer relation with the diamond.

While for simplicity the thin sputtered layers 90, 92, and 94 of FIG. 5 are not shown in FIG. 6, the said transducing mechanism is desirable in all the cooling embodiments described herein in which a diamond heat transfer surface interfaces with a heat sink formed from a metal such as copper.

Figure 7:
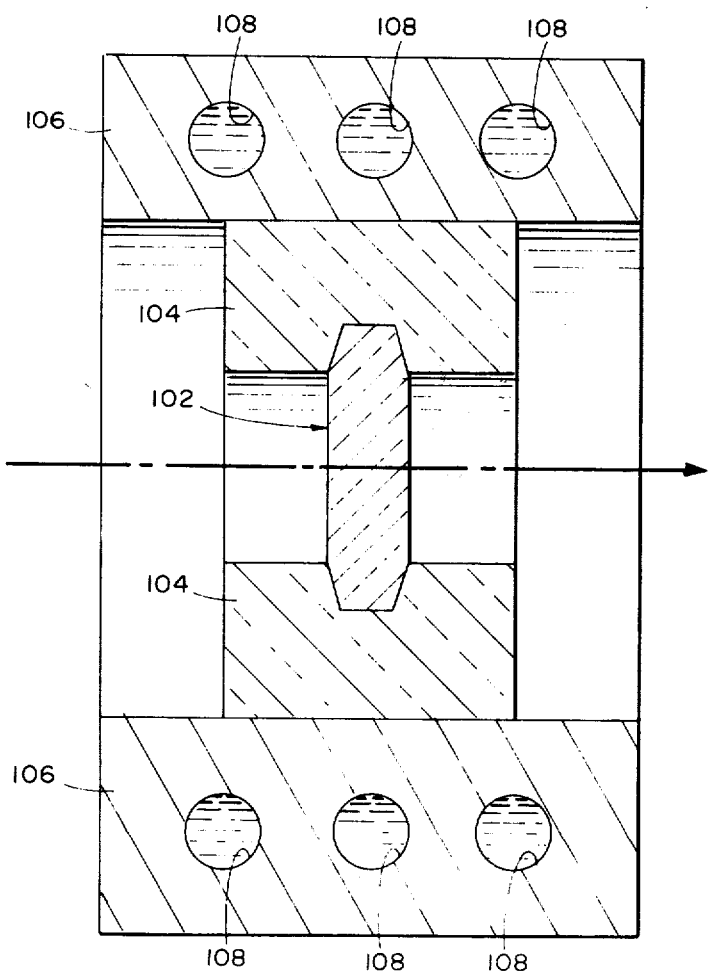

In FIG. 7 a single diamond 102 is employed as a window while several other diamonds 104 having a similar high thermal conductivity are located in intimate heat transfer relation with the window diamond 102 and serve as a heat transfer means. The window diamond 102 may absorb less radiation at the beam wavelength than the best transfer diamonds 104, which do not transmit any part of the beam. The window 102 and heat transfer diamonds 104 are interfaced either directly, requiring a perfect mechanical fit (diamond's high thermal conductivity and low expansion prevents thermal distortion from becoming an impediment to good fit), or by the use of very thin metal foils or layers of thermally conductive metal such as gold or silver sputtered onto adjacent diamond surfaces. Adjacent diamond surfaces are mechanically lapped to tolerances of less than ten thousandths of an inch, followed by sputtering of the metal films onto the diamond surfaces in thicknesses of less than 50 microns, and preferably in the order of microns. The diamonds are maintained at as high a temperature as possible during sputtering, after which the surfaces are directly compressed, preferably in a vacuum. Gold, silver, and platinum films in very good vacua will weld to each other by purely diffusive means. Subsequent melting of the metallic layers is prevented by the high thermal conductivity of the diamond on each side of the layer. The heat transfer diamonds 104 may themselves be contacted by a metallic heat sink 106, which may contain interior channels 108 for the flow of a coolant fluid.

In another cooling arrangement, a diamond is held in intimate contact with a sheet of pyrolytic graphite by means of a spring washer, the central portion of the diamond being aligned in registry with an opening in the pyrolytic graphite sheet to provide a window area. The thermal conductivity of pyrolytic graphite being characteristically much greater in the plane of the sheet corresponding to the basic crystallographic orientation of the graphite than in a transverse direction, good heat transfer away from the diamond to a heat sink may be attained.

Figures 8, 9, 10:
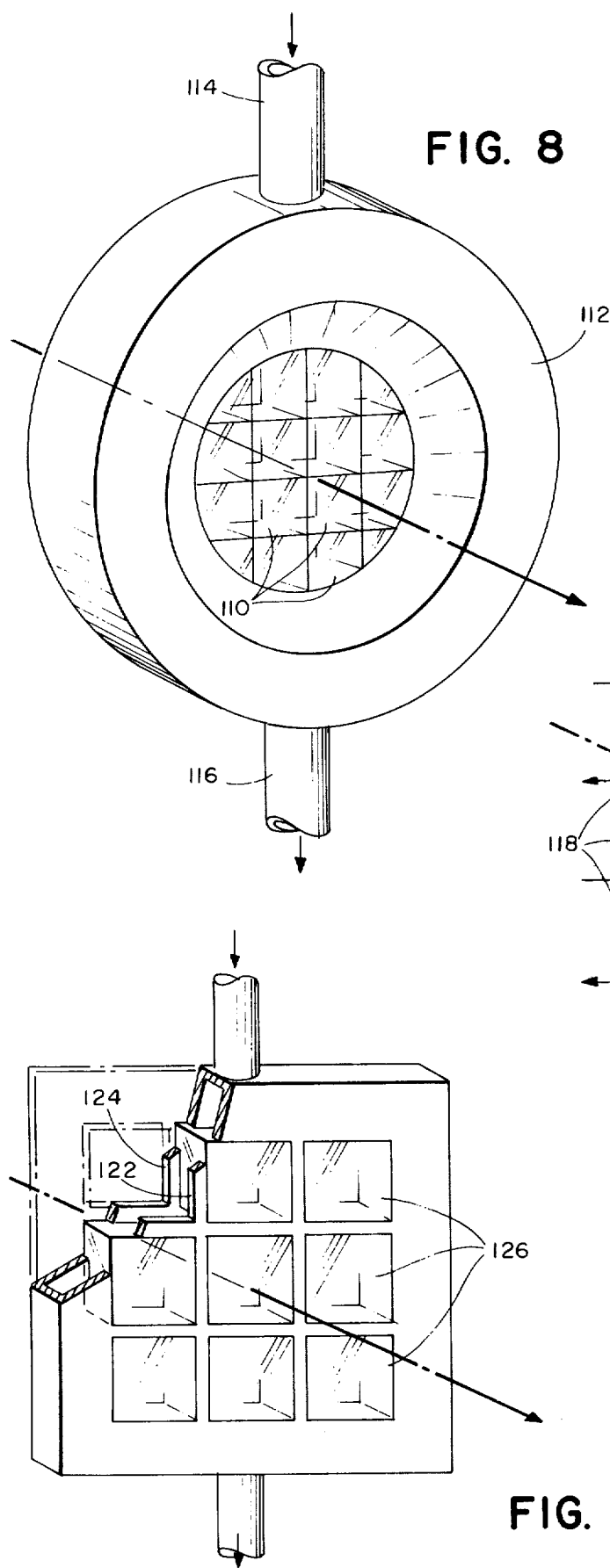

While the above window configurations each employ a single diamond as a window medium, it may be desirable to form a window from a plurality of diamonds. For example, it may be desired to expand the beam diameter to a number of centimeters for operation at very high powers and power densities, or in order to operate at intermediate power densities without thermal streaming, thermal pluming, or other detrimental lensing effects on beam quality due to heating of the air at power densities greater than about 1,000,000 watts/cm$^2$. There may, in addition, exist large laser configurations in which is not geometrically feasible to reduce the beam diameter to dimensions of less than several centimeters. In any of these situations, the window area required may be larger than any commercially available natural or synthetic diamond. In such a case, a number of pieces of diamond can be assembled into a spatial array of preferably hexagonal tiles, or any other geometry, such as square or rectangular plates, that may be convenient to fabricate. As in the embodiment of FIG. 7, diamond-to-diamond bonds may be established by means of thin metallic interface layers having high thermal conductivities. An alternate means of achieving efficient thermal contact between adajcent diamond surfaces consists of essentially two back-to-back series of sputtered metal layers as described with reference to FIG. 5, emplaced between the diamonds, i.e., layers comprising in succession titanium, platinum, copper, platinum, titanium. In FIG. 8 a plurality of diamond segments 110 are shown arranged in such an array, with the edge and outer face portions of the array enveloped in a toroidal collar 112 containing a fluid coolant. A fluid inlet 114 and outlet 116 are provided to the collar 112, and preferably cooperate to maintain a cooling fluid in a vortical flow about the array.

Referring to FIG. 9, when both large size and a higher rate of heat transfer from the diamonds comprising the window is desired, which is to say in the operation of a large, very high-power density laser, the geometry of FIG. 8 may be improved at a cost of some transmissive ability by mounting individual diamond polygons or windowpanes 118 in the interstices of an array of copper, silver, gold, or similar metal tubes 120. The metal tubes fix the position of the windowpanes and also cool them by heat transfer from the diamond, through the walls of the tubes, to an inside coolant. It may be desirable to use an interfacing layer such as that described in connection with FIG. 5 between the diamond and the tubes.

Alternately, a grid system may be used to position and support the diamond panes while a coolant flows between the panes. As shown in FIG. 10, a grid consisting of two planar metal grills 122 and 124 has a plurality of diamond panes 126 positioned in alignment with the grill openings. Metal pins or spacers are provided mechanically to affix the grills 122 and 124 and to hold the diamond panes 126 in compression therebetween, coolant being circulated in channels formed between the edges of the diamond panes 126 and the grills 122 and 124.

Preferred coolants for the embodiments of FIGS. 9 and 10, in order of ascending ability to transfer heat, are air, helium, water, various organic liquids, and liquid metals, the latter category commencing with mercury and extending to gallium and sodium/potassium alloys. Gallium, despite its corrosive character relative to most metals, is recommended in this instance because of its extremely high liquid range (to over 2,000°C.), its lower molecular weight, good heat transfer properties, and the fact that it does not attack diamond below 1,500°K.

Several further refinements are possible for a window embodiment employing an array of cooling tubes. In most lasers, the output beam in the TEM ∞ mode is circular in profile and has a roughly gaussian distribution of energy across its diameter. There also exist higher order oscillatory modes in which the output beam power is split into more than one principal node. The concentration of the output power into two or four discrete high-power density spots permits the use of a geometry in which the diamond windowpanes are spatially arranged to coincide with the location of the high energy density nodes, leaving the support structure located physically at the low energy areas separating the high power density nodes of the beam. Thus, as little as 5 or 10 percent of the output energy might be located at the support structure, which structure would comprise about 10 or 20 percent by area of the entire window.

Figure 11:
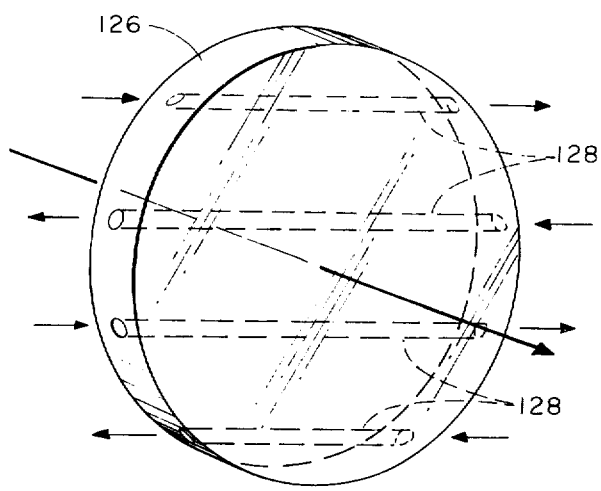

FIG. 11 illustrates a monolithic embodiment of the cooled array of FIGS. 9 and 10, comprising a large disk diamond 126 through which a plurality of channels 128 have been drilled to permit the passage of a coolant.

Figure 12:
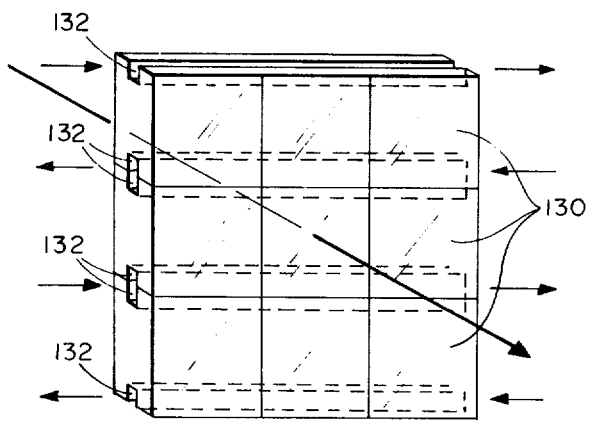

FIG. 12 involves a window array with a plurality of diamond panes 130 having matching channels 132 cut into their edges and joined together with the channels 132 of adjacent panes aligned to form continuous coolant flow passages into and out of the window. The assembly and fluid-tightness of the array is achieved either by exact mechanical construction or by the use of thin metallic layers, as described previously.

Figure 13:
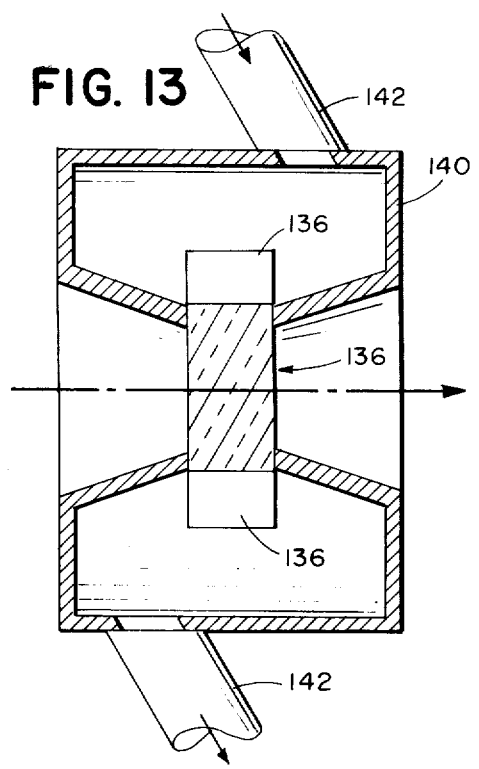

For the highest cooling rates for peripherally cooled windows, a liquid coolant is moved at a high velocity past a large fraction of the area of the window material. Presuming a radial geometry, as shown in FIG. 13, an outward portion 136 of a window diamond 138 external to the window area is surrounded by a torous of metal 140 of appropriate high thermal conductivity, through which a liquid metal coolant is rapidly circulated via a multiplicity of inlets and outlets 142. The outward diamond portion 136 may be either tapered to a knife edge in the coolant, or splayed to increase its heat transfer area. Whether the heat transfer area should be increased or decreased in relation to the thermal mass differential of the diamond is determined either experimentally or by computation of the effective heat transfer for the particular window geometry and coolant flow configuration.

Figure 14:
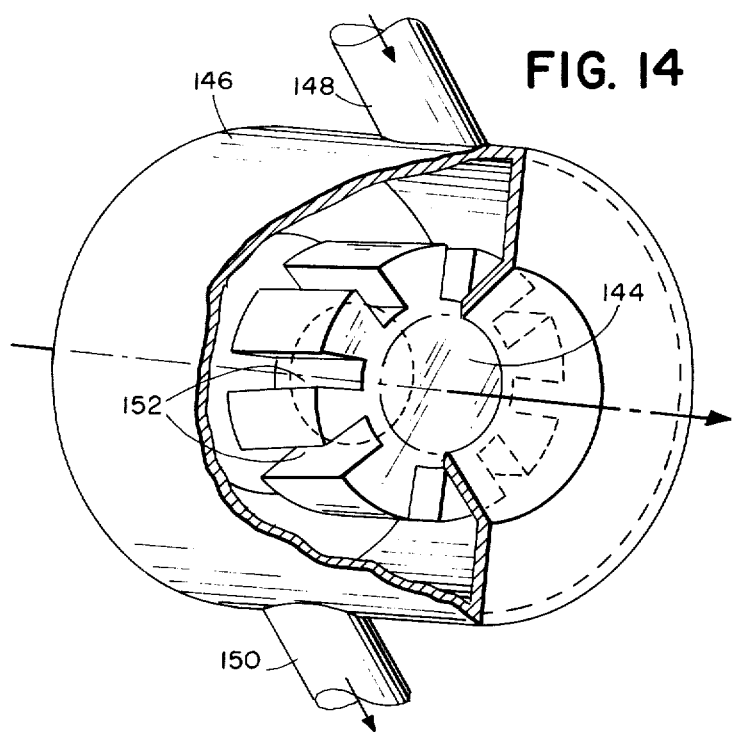
Figure 15:
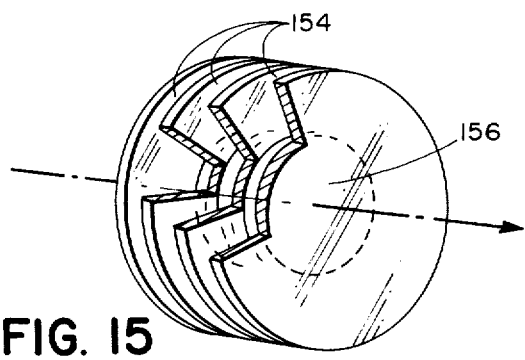
Figure 16:
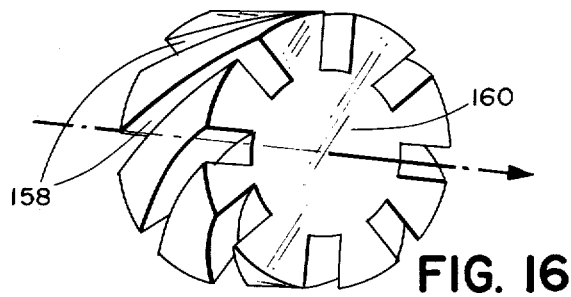

Various adjustments of the diamond geometry are possible to increase the effective heat transfer area and thereby enhance the flow of heat from the diamond into the coolant. In FIG. 14 a fluid cooled embodiment is shown with a diamond window 144 peripherally surrounded by a coolant fluid held in a toroidal container 146 having an inlet 148 and an outlet 150. A plurality of channels 152 are cut in from the outer edge of the diamond and extend to near the window area, thereby expanding the area contact between the diamond and the coolant. In FIG. 15 a plurality of annular channels 154 are cut in from the edge of a window diamond 156, to a depth of approximately one-half radius. In FIG. 16 a plurality of curved channels 158 are cut in from the edge of a window diamond 160 in a manner to enhance the circulation of a coolant fluid while increasing the effective heat transfer area. Peltier thermopiles, preferably bismuth telluride, may also be employed for edge cooling.

Figure 17:
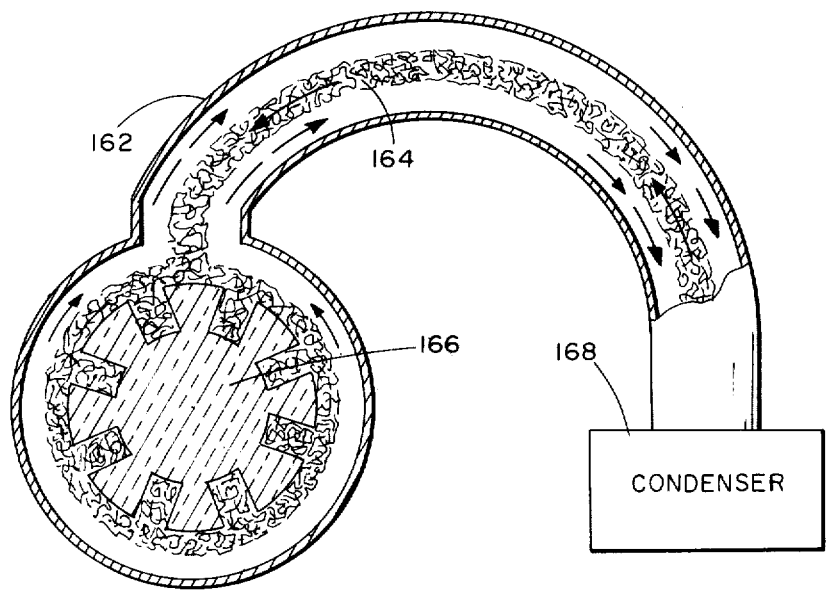

A superior arrangement for removing heat from a diamond window, shown in FIG. 17, utilizes a heat pipe 162 containing a coaxial wick 164 surrounding the edge of a channeled window diamond 166 to draw a liquid coolant into contact with the diamond 166 by capillary action. The coolant boils off at the diamond edge and returns down the pipe 162 to a condensor 168 where it is condensed and again supplied to the wick 164. A more rapid conduction of heataway from the diamond is attainable with the heat pipe than with the solid or fluid heat sinks described above, so long as an adequate temperature differential is maintained between the liquid and gaseous states of the coolant. Molten metals such as sodium and potassium are suitable as coolants to about 1,000°K, as are cryogenic materials such as liquid nitrogen. Helium III is a preferred coolant because of its extremely low viscosity and very efficient heat transfer in its liquid state below 4.6°K. It lowers the temperature at the edge of the diamond to less than about 5°K, thereby optimizing the heat flow from the diamond center to its edge by causing the temperature at the center of the diamond to approach 70°K.

Figure 18:
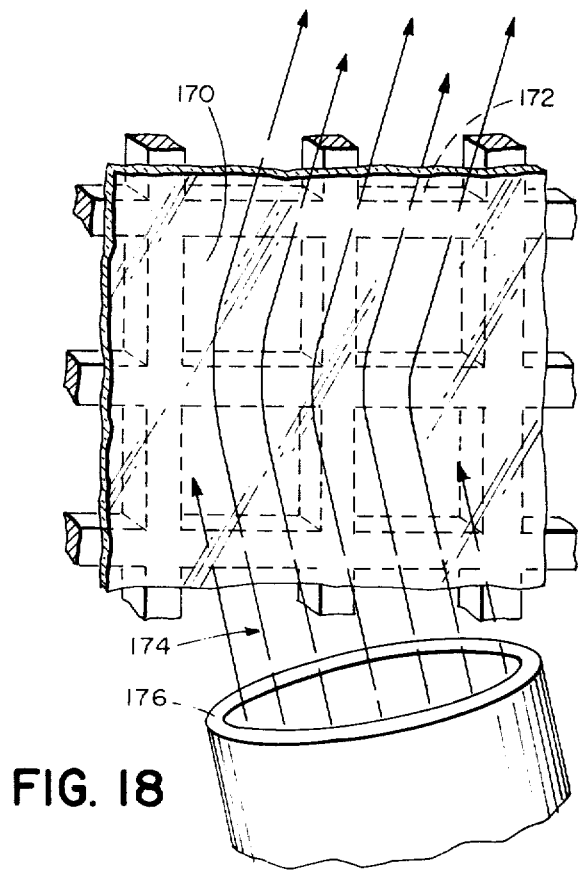

The above edge cooling embodiments are most useful for high-powered lasers with windows having a diameter no greater than about 5 cm. With larger windows, the rate of heat transfer out of the window decreases to a level at which serious overheating can occur at the higher power densities. In FIG. 18, a gas cooled embodiment suitable for use with large surface area windows is shown. A thin diamond window plate 170, preferably less than one mm. thick, is mounted on a supporting grid 172. The laser beam is transmitted through the majority of the window 170 not obscured by the grid 172. A plurality of plates of diamond may be used in place of the single plate shown in FIG. 18 to produce larger windows. A gaseous coolant 174, preferably hydrogen or helium, is pumped out of an orifice 176 and flows transversely across the outer face of the window 170.

Figure 19:
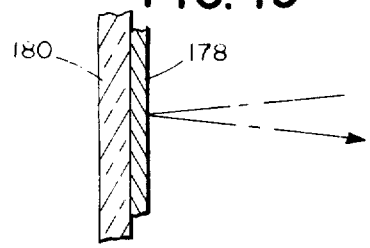
FIGS. 19 and 20 show reflector embodiments utilizing a diamond substrate.

As mentioned previously, diamond has been found to have additional laser applications in reflectors and interference filters. Such equipment, if thermally fragile, may limit the very high power densities otherwise contemplated herein, especially in the case of reflectors handling a highly amplified beam, such as the last reflector 38 in the series of reflectors 24–38 in FIG. 2. In a first embodiment of an improved reflector, shown in FIG. 19, a reflecting metal layer 178 is mounted on a thin diamond substrate 180 having a thermal conductivity of at least 10 watts/cm.°K at 300°K that transfers heat away from the reflecting surface 178. In this embodiment, only the thermal properties of diamond are of concern, and less expensive, low optical quality specimens may be used, such as Type IIa which exceeds the thermal conductivity of copper, the material most frequently used presently, by a factor of about 3.

Figure 20:
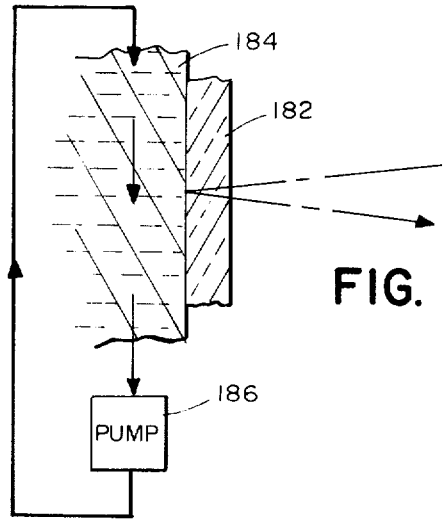

In another embodiment, FIG. 20, a thin diamond layer 182 of high optical quality provides a flow surface for a flowing, metallic reflecting substance 184, preferably liquid mercury or gallium impelled by a pump 186. The incident beam traverses the diamond member 182, reflects off the metallic liquid 184, and traverses back through the diamond member 182. In this embodiment low optical absorption at the beam wavelength is essential, requiring diamond with a small impurity content and laser operation at a wavelength at which diamond is substantially transparent. In this regard the great strength of diamond may be useful in obtaining a mechanically robust specular flow substrate thin enough to substantially reduce absorption and extend the operational power level beyond that of heretofore known reflectors.

In both of the above reflector embodiments, heat transfer means similar to those employed in conjunction with the diamond window may be used to conduct heat away from the diamond substrate.

For a beam having a wavelength of about 5.6 microns, diamond by itself is an excellent reflecting medium because of reststrahl reflection effects discussed previously. A member formed from diamond with a thermal conductivity of at least 10 watts/cm.°K at 300°K is capable of reflecting, at an angle less than the Brewster angle, a continuous beam with a power density exceeding 10,000 watts/cm.$^2$ over an area of at least one square mm. with no thermal degradation.

While several embodiments of this invention have been shown and described, there are modifications thereof which will be apparent to those skilled in the art, and therefore it is not intended that the invention be limited to the disclosed embodiments or to the details thereof, and departures may be made therefrom within the spirit and scope of the invention as defined in the claims.

What is claimed is:

1. A laser system including a laser generator for generating a beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns, about 3.6 to about 3.8 microns, and above about 6.8 microns, enclosure means for said generator, a diamond laser window for transmitting said beam out of said enclosure means, said diamond having a thermal conductivity of at least 10 watts/cm.°K. at 300°K. and an optical absorption at the beam wavelength of no more than 10–20% and means for cooling said diamond laser window.

2. The laser system of claim 1, wherein the diamond of said laser window is synthetically grown to have the defined thermal conductivity and optical absorption characteristics.

3. The laser system of claim 2, wherein said synthetic diamond is formed substantially completely from one of the isotopes in the group of isotopes consisting of carbon 12 and carbon 13, whereby the thermal conductivity of said window is enhanced by the elimination of Umklapp scattering caused by the mass differential between carbon 12 and carbon 13 atoms present in natural diamond.

4. The laser system of claim 1, wherein said laser generator includes a carbon dioxide lasing medium and is adapted to generate a laser beam having a wavelength of about 10.6 microns.

5. The laser system of claim 1, wherein said laser generator includes a deuterium fluorine lasing medium and is adapted to generate a laser beam having a wavelength of about 3.8 microns.

6. The laser system of claim 1, wherein said laser generator includes a carbon monoxide lasing medium and is adapted to generate a laser beam having a wavelength of about 3.8 microns.

7. The laser system of claim 1, said laser generator being adapted to generate a laser beam having a predetermined wavelength, wherein the thickness of said laser window is less than said predetermined wavelength and equal to an odd multiple of one-quarter of said predetermined wavelength, whereby the optical absorption of said beam in said window is minimized.

8. The laser system of claim 1, wherein said laser window is positioned at a confocal point of said laser beam, said beam thereby occupying a minimum cross-sectional area and having a maximum power density at the site of transmission out of said enclosure means.

9. The laser system of claim 1, wherein said cooling means includes a pressure deformed heat conductive metal member intimately engaging a face of said diamond laser window in direct heat transfer relation therewith, said member serving to conduct heat away from said window.

10. The laser system of claim 1, wherein said cooling means includes a heat transfer medium formed from diamond separate from and in intimate heat transfer relation with said diamond laser window, said diamond heat transfer medium serving to conduct heat away from said window.

11. The laser system of claim 10, wherein said diamond laser window absorbs less radiation at the wavelength of said laser beam than said diamond heat transfer medium.

12. The laser system of claim 1, said laser window comprising an inward portion of a diamond, wherein said cooling means comprises means for contacting an outward portion of said diamond with a fluid coolant.

13. The laser system of claim 12, wherein the surface of said outward diamond portion is channeled to increase the contact area between said outward portion and said coolant, and thereby enhance the flow of heat from said diamond into said coolant.

14. The laser system of claim 12, wherein said surface contacting means comprises a heat pipe means having a wick adapted to draw a liquid coolant into heat transfer contact with the surface of said outward diamond portion, said heat pipe means further providing a return path for coolant vaporized by heat transfer from said diamond.

15. The laser system of claim 1, wherein said laser window comprises a plurality of diamonds arranged in a spatial array to provide a window having a total area greater than the area of any one of said diamonds, and said cooling means comprises means occupying a portion of said total window area for containing a fluid coolant in heat transfer relation between adjacent diamonds in said window.

16. The laser system of claim 15, said laser being adapted to produce a laser beam having a plurality of discrete high energy density nodes, wherein the diamonds forming said window are spatially arranged to coincide with the location of said high energy density nodes, whereby the proportion of the laser beam energy transmitted through said diamonds is greater than the proportion of the window area occupied by said diamonds.

17. The laser system of claim 15, wherein said coolant containing means comprises a heat conductive tube grid interspersed in heat transfer relation between, and fixing the position of, the diamonds in said window.

18. The laser system of claim 15, wherein said coolant containing means comprises a pair of grills assembled to position and support said diamonds in alignment with the grill openings, said grills in conjunction with the edges of said diamonds forming channels to contain the said coolant.

19. The laser system of claim 15, wherein said coolant containing means comprises a plurality of interconnecting channels formed in the edges of adjacent diamonds in said window array, said channels being arranged to provide continuous coolant flow paths into and out of said window.

20. The laser system of claim 1, wherein said laser window comprises an inward portion of a generally spherical diamond, said inward portion extending along a diameter of said diamond between opposite surfaces thereof, and wherein said cooling means includes the outward portion of said diamond surrounding said inward portion, said outward diamond portion serving to transfer heat away from said inward diamond portion.

21. The laser system of claim 1, wherein said diamond window is less than about 1 mm. thick and has a first face internal to said enclosure means and a second face external to said enclosure means, and wherein said cooling means comprises a cooling gas in combination with means for directing said gas along the surface of said external window face.

22. The laser system of claim 1, and further including a reflector disposed in the path of said laser beam to direct the said beam through the lasing medium of said laser generator, said reflector comprising a layer of beam reflective material and a substrate in direct heat transfer contact with the said reflective layer, said substrate being formed from diamond having a thermal conductivity of at least 10 watts/cm.°K. at 300°K.

23. The laser system of claim 22, wherein said reflective layer comprises a flowing metallic liquid, said diamond substrate being adapted to provide a flow surface for said metallic liquid, said reflector being disposed in said laser system with said diamond substrate between an incident laser beam and said metallic liquid, said diamond substrate being substantially transparent to said beam at the wavelength thereof, and including means to move said metallic liquid in flowing contact over said diamond flow surface, whereby the laser beam traverses the said diamond substrate immediately before and after reflection from said metallic liquid.

24. The method of transmitting through a solid medium a laser beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns, about 3.6 to about 3.8 microns, and above about 6.8 microns, comprising providing in the path of said laser beam a diamond medium having a thermal conductivity of at least 10 watts/cm.°K. at 300°K. and an optical absorption at the laser beam wavelength of no more than 10–20%.

25. The method of claim 24, and further including the step of cooling said diamond medium.

26. The method of claim 24, including the step of generating said beam at a wavelength of about 10.6 microns through a carbon dioxide lasing medium prior to transmission of the beam through said diamond medium.

27. The method of claim 24, including the step of generating said beam at a wavelength of from about 3.6 to about 3.8 microns through a deuterium fluorine lasing medium prior to transmission of the beam through said diamond medium.

28. The method of claim 24, including the step of generating said beam at a wavelength of from about 3.6 to about 3.8 microns through a carbon monoxide lasing medium prior to transmission of the beam through said diamond medium.

29. A laser window assembly suitable for use in a laser system adapted to generate a beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns, about 3.6 to about 3.8 microns, and above about 6.8 microns, comprising a diamond laser window, said diamond having a thermal conductivity of at least 10 watts/cm.°K. at 300°K. and an optical absorption at the beam wavelength of no more than 10–20%, and means for cooling said diamond laser window.

30. The laser window assembly of claim 29, wherein the diamond of said laser window is synthetically grown to have the defined thermal conductivity and optical absorption characteristics.

31. A laser system including a laser generator for generating a laser beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns and above about 6.8 microns, enclosure means for said generator, window means for transmitting said beam out of said enclosure, and a reflector means positioned in said enclosure in the path of said laser beam, said reflector means including a metallic liquid reflective of said laser beam, a member forming a flow surface for said metallic liquid, said member formed from diamond having a thermal conductivity of at least 10 watts/cm.°K. at 300°K. and an optical absorption at the beam wavelength of no moore than 10%/cm., and means to move said metallic liquid in flowing contact over the flow surface of said diamond member, said reflector means disposed in said enclosure with said diamond member between the incident laser beam and said metallic liquid, whereby the beam traverses the said diamond member immediately before and after reflection from said metallic liquid.

32. The method of reflecting a laser beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns and above about 6.8 microns, comprising providing in the path of said beam a diamond member having a thermal conductivity of at least 10 watts/cm.°K. at 300°K. and an optical absorption at the beam wavelength of no more than 10%/cm., and having a flow surface on the side of the member away from said beam, and flowing a beam reflective metallic liquid over said flow surface, whereby said beam successively traverses said diamond member, reflects off of said metallic liquid, and traverses back through said metallic member.

33. A laser system including a laser generator for generating a laser beam having a long term heating effect on diamond equivalent to that of a continuously generated beam having a power density of at least 10,000 watts/cm.$^2$ over an area of at least on square mm., and a wavelength of about 5.6 microns, and reflector means positioned in the path of said laser beam, said reflector means formed from diamond having a thermal conductivity of at least 10 watts/cm.°K. at 300°K.

34. The method of reflecting a laser beam having a long term heating effect on diamond equivalent to that of a continuously generated beam having a power density of at least 10,000 watts/cm.$^2$ over an area of at least one square mm., and a wavelength of about 5.6 microns, comprising providing in the path of said beam a reflecting member formed from diamond having a thermal conductivity of at least 10 watts/cm.°K. at 300°K.

35. The method of transmitting through a solid medium a laser beam generated in a carbon dioxide lasing medium and having a long term heating effect on diamond equivalent to that of a continuously generated beam having a power density of at least 1,000,000 watts/cm.$^2$ over an area of at least one square mm., and a wavelength of about 10.6 microns, comprising providing in the path of said laser beam a diamond medium having a thermal conductivity of at least 20 watts/cm.°K. at 300°K. and an optical absorption at the laser beam wavelength of no more than about 10%.

36. A laser system including a laser generator for generating a laser beam having a long term heating effect on diamond equivalent to that of a continuously generated beam having a power density of at least 10,000 watts/cm.$^2$ over an area of at least one square mm., and reflector means in the path of said laser beam, said reflector means being formed from diamond having a thermal conductivity of at least 10 watts/cm.°K. at 300°K.

37. A laser system including a laser generator for generating a beam having a long term heating effect on diamond equivalent to that of continuously generated beam having a power density of at least 100,000,000 watts/cm.$^2$ and a wavelength within the set consisting of the wavelengths from about 0.2 to about 2 microns, about 3.6 to 3.8 microns, and above about 6.8 microns, enclosure means for said generator, a diamond laser window for transmitting said beam out of said enclosure means, said diamond having a thermal conductivity of at least 200 watts/cm.°K. at 70°K., an impurity content of no more than one in 1,000,000,000, and an optical absorption at the beam wavelength of no more than 1% per cm., and means for cooling the transmissive portion of said diamond laser window to about 70°K.

38. A laser system including a laser generator for generating a beam having a long term heating effect on diamond equivalent to that of a continuously generated beam having a power density of at least 10,000 watts/cm.$^2$ over an area of at least one square mm., and a wavelength within the set consisting of the wavelengths from about 0.2 to about 2 microns, about 3.6 to about 3.8 microns, and above about 6.8 microns, enclosure means for said generator, and a laser window for transmitting said beam out of said enclosure means consisting of substantially intrinsic diamond.

* * * * *